United States Patent
Hata et al.

(10) Patent No.: US 7,773,265 B2
(45) Date of Patent: Aug. 10, 2010

(54) IMAGE CORRECTION APPARATUS AND IMAGE CORRECTION METHOD

(75) Inventors: Kumi Hata, Ueda (JP); Masatoshi Nakazawa, Ueda (JP); Atsushi Sakai, Sakoki-machi (JP)

(73) Assignee: Seiko Epson Corporation, Tokyo (JP)

( * ) Notice: Subject to any disclaimer, the term of this patent is extended or adjusted under 35 U.S.C. 154(b) by 852 days.

(21) Appl. No.: 11/559,832

(22) Filed: Nov. 14, 2006

(65) Prior Publication Data

US 2007/0115504 A1    May 24, 2007

(30) Foreign Application Priority Data

Nov. 18, 2005    (JP)    ............................. 2005-334994

(51) Int. Cl.
*H04N 1/405*    (2006.01)
(52) U.S. Cl. ..................................... 358/3.01; 358/3.06
(58) Field of Classification Search .................. 358/1.9, 358/2.1, 461, 3.01, 3.02, 3.06, 3.21; 382/169
See application file for complete search history.

(56) References Cited

U.S. PATENT DOCUMENTS 6,006,226 A * 12/1999 Cullen et al. ................... 707/6
2008/0291500 A1* 11/2008 Asai ........................ 358/3.06

FOREIGN PATENT DOCUMENTS

JP    2000206937    7/2000
JP    2005077638    3/2005

* cited by examiner

*Primary Examiner*—Thomas D Lee
*Assistant Examiner*—Stephen M Brinich
(74) *Attorney, Agent, or Firm*—Mark P. Watson

(57) ABSTRACT

An image correction apparatus and method enable correcting an image so that the image is always discernible and at least text can be read regardless of user settings. A correction range that increases the gray level and a correction range that decreases the gray level are calculated for each image to calculate the correction range suitable for the particular image.

5 Claims, 10 Drawing Sheets

SAMPLE IMAGE BEFORE GAMMA CORRECTION

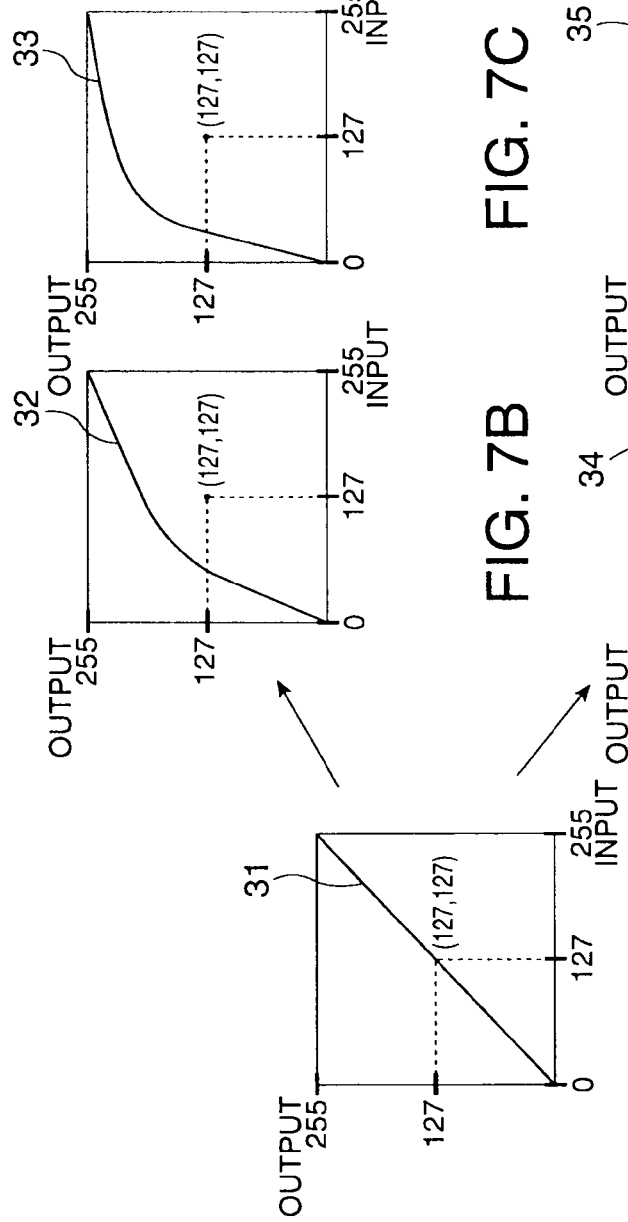

SAMPLE IMAGE BEFORE GAMMA CORRECTION — 40

⬇ ENLARGED

PIXELS IN THE IMAGE — 42 — 10 LUMINANCE VALUE

IMAGE CORRECTION APPARATUS AND IMAGE CORRECTION METHOD

RELATED APPLICATIONS

Japanese patent application No. 2005-334994 is hereby incorporated by reference in its entirety.

BACKGROUND OF THE INVENTION

1. Field of the Invention

The present invention relates to an image correction apparatus and an image correction method for correcting gradation values in image data.

2. Description of the Related Art

A digital image is an image in which the value of each pixel is represented as a single sample, typically composed of shades of gray, varying from black at the weakest intensity to white at the strongest. Gray-scale images intended for visual display are typically stored with 8 bits per sampled pixels, thereby allowing 256 intensities (i.e. shades of gray, or gray-scale levels, or gray levels) to be recorded. A color image may be recorded, for example, with 24 bits per pixel, e.g. RGB (red, green, blue) 8:8:8. The terms "gray-scale level" and "gray level" will be used interchangeably herein.

Image correction methods that correct the gradation level (gray level) of digital images presented on a monitor or other type of image display device according to a user setting are known from the literature. Images can be corrected as needed by the user by adjusting the gray level of the value of the pixels forming the image. Various methods can be used to correct the brightness (value) information in digital images, and gamma correction is one method of correcting image brightness and contrast by adjusting the gamma curve. The gamma curve is a function representing the relationship between the gray level of the input signal on the x-axis and the gray level of the output signal on the y-axis. As shown in FIG. 10, for example, if the input signal on the x-axis and the output signal on the y-axis can range from 0 (dark) to 255 (light) and the gamma curve 50 is a ramp with a slope of 45°, the input value and the output value are the same and no gamma correction is applied. Image brightness and contrast can be precisely adjusted by adjusting this gamma curve.

Referring to FIG. 11 and Japanese Unexamined Patent Appl. Pub. 2005-77638, when the gamma curve 51 is in the domain under the ramp with a slope of 45° (such as when the gamma curve (called a "tone curve" in the cited application) is downwardly concave with a low slope on the low gray level side and a steep slope on the high gray level side), the range of gray scale values in the image is compressed into the low gray level domain and the overall image becomes darker. Conversely, when the gamma curve 52 is in the domain above the ramp (such as when the gamma curve is upwardly concave with a steep slope on the low gray level side and a gradual slope on the high gray level side), the range of gray scale values in the image expands into the high gray level domain and the overall image becomes brighter.

The gamma function f(x) gives the curve of the brightness correction afforded by the gamma curve. The gamma function resulting in the lowest image brightness (black) is f(x)=0 as denoted by curve (straight line in this instance) 53 in FIG. 12, and the gamma function resulting in the greatest image brightness (white) is f(x)=255 as denoted by curve (straight line in this instance) 54 in FIG. 12. However, if gamma correction ranges from f(x)=0-255 and gamma is set to f(x)=0, gray level 0 will be output for all input values, the output image will be the darkest displayable image, that is, completely black, and no image details will be discernible. Likewise, if gamma correction is set to f(x)=255, gray level 255 will be output for all input values, the output image will be the brightest displayable image, that is, completely white, and no image details will be discernible.

The correction range is therefore reduced to enable converting the input image to a usable output image and not output a completely black or a completely white image. More specifically, displaying a completely black or a completely white image is prevented by not applying gamma correction using specific functions including f(x)=0 and f(x)=255 indicated by the shaded areas (a) and (b) in FIG. 11.

However, when the correction range is limited as described above, the correction range (c) in FIG. 11 for brightening an image that is dark overall is the same size as the correction range (d) in FIG. 11 for darkening an image that is bright overall regardless of the actual image brightness level because the correction range is limited so that the center of the correction range is a simple line with a slope of 45°, even though the correction needed to brighten (darken) an image that is dark (light) overall is greater than the correction needed to darken (brighten) the image.

If the correction range for increasing image brightness and the correction range for decreasing image brightness are the same size, the correction process may needlessly brighten an image that is light overall (such as a source image that contains text) where the correction needed to further brighten the image is less than the correction needed to darken the image. More specifically, depending upon the user settings, conversion using a function f(x) that brightens the image more than the correction range that is actually appropriate to the image may be needlessly applied. This also applies to images that are dark overall. The resulting image may therefore not enable reading individual characters in a block of text, for example, due to image whiteout or blackout.

The image correction apparatus and image correction method of this invention enable correcting images so that image recognition, and particularly reading text in the image, is possible regardless of the user settings.

SUMMARY OF THE INVENTION

An image correction apparatus according to a first embodiment of the invention for correcting the gray level of pixels in an image includes a controller that computes a correction range for an image by separately calculating for the image a correction range for increasing the gray levels and a correction range for decreasing the gray levels.

Preferably, the controller determines the correlation between the gray levels before correction and the gray levels after correction, and computes the correction range so that the correlation when the gray levels increase and the correlation when the gray levels decrease are asymmetric.

Yet further preferably, the gray levels representing the pixels in the image include 256 gray levels ranging from 0 to 255 where the bit depth of each pixel is 8 bits. The controller calculates a statistical count of each of the 256 gray levels for a plurality of pixels, calculates a first total by accumulating the statistical counts starting from value 0 and a second total by accumulating the statistical counts starting from value 255, calculates a value for determining a correction range for increasing the gray levels and calculates a value for determining a correction range for decreasing the gray levels, calculates a correction range that decreases the gray level based on the value at which the first total exceeds the value for determining the correction range for increasing the gray levels, and calculates a correction range that increases the gray level based on the value at which the second total exceeds the value for determining the correction range for decreasing the gray level.

Yet further preferably, the value for determining a correction range for increasing the gray levels and the value for determining a correction range for decreasing the gray levels are acquired by weighting using the total from value 0 to 127 and the total from value 255 to 128.

An image correction method according to another embodiment of the invention has a first calculation step that calculates a correction range for increasing the gray levels and a correction range for decreasing the gray levels; and a second calculation step that calculates a correction range for the image based on the correction range for increasing the gray level and the correction range for decreasing the gray level that were calculated in the first calculation step.

Preferably, each pixel in the image can be represented by one of 256 gray levels ranging from 0 to 255 where the bit depth of each pixel is 8 bits, and the first calculation step calculates a statistical count of the 256 gray levels for a plurality of pixels, calculates a first total by accumulating the statistical counts starting from value 0 and a second total by accumulating the statistical counts starting from value 255, calculates a value for determining a correction range for increasing the gray levels and calculates a value for determining a correction range for decreasing the gray levels, calculates a correction range that decreases the gray level based on the value at which the first total exceeds the value for determining the correction range for increasing the gray levels, and calculates a correction range that increases the gray levels based on the value at which the second total exceeds the value for determining the correction range for decreasing the gray level.

Yet further preferably, the value for determining a correction range for increasing the gray levels and the value for determining a correction range for decreasing the gray levels are acquired by weighting using the total of value 0 to 127 and the total from value 255 to 128.

By separately calculating for each image a correction range that increases the gray level and a correction range that decreases the gray level, the correction range can be adjusted to the gray levels in the original image.

Furthermore, by calculating the correction range so that the curve on the side increasing the gray level and the curve on the side decreasing the gray level are asymmetrical, the correction range for increasing the gray level and the correction range for decreasing the gray level can be calculated according to the brightness (value) distribution in the original image.

Furthermore, because the correction range for decreasing (increasing) the gray level is calculated from brightness (value) information with a high (low) gray level when the gray level of the original image overall is high (low), a gamma range that is appropriate to the correction required by the original image can be calculated. More specifically, because the correction range that is not required by the original image is cut off and correction is limited to the required correction range, an image that is always readable can be output with no whiteout or blackout.

Furthermore, because the value for determining the correction range increasing the gray level and the value for determining the correction range decreasing the gray level are weighted before the correction range is determined, a correction range that is more appropriate to the original image data can be calculated even when the gray level of the original image is biased to a high gray level or a low gray level.

Other objects and attainments together with a fuller understanding of the invention will become apparent and appreciated by referring to the following description and claims taken in conjunction with the accompanying drawings.

BRIEF DESCRIPTION OF THE DRAWINGS

FIGS. 7A-7F show the luminance correction range defined by the resulting gamma curves.

DESCRIPTION OF THE PREFERRED EMBODIMENTS

Preferred embodiments of an image correction apparatus and image correction method according to the present invention are described below with reference to the accompanying figures using by way of example a host computer connected to a printer that has an image reading function.

Internal Arrangement of the Host Computer and Printer

Figure 1:
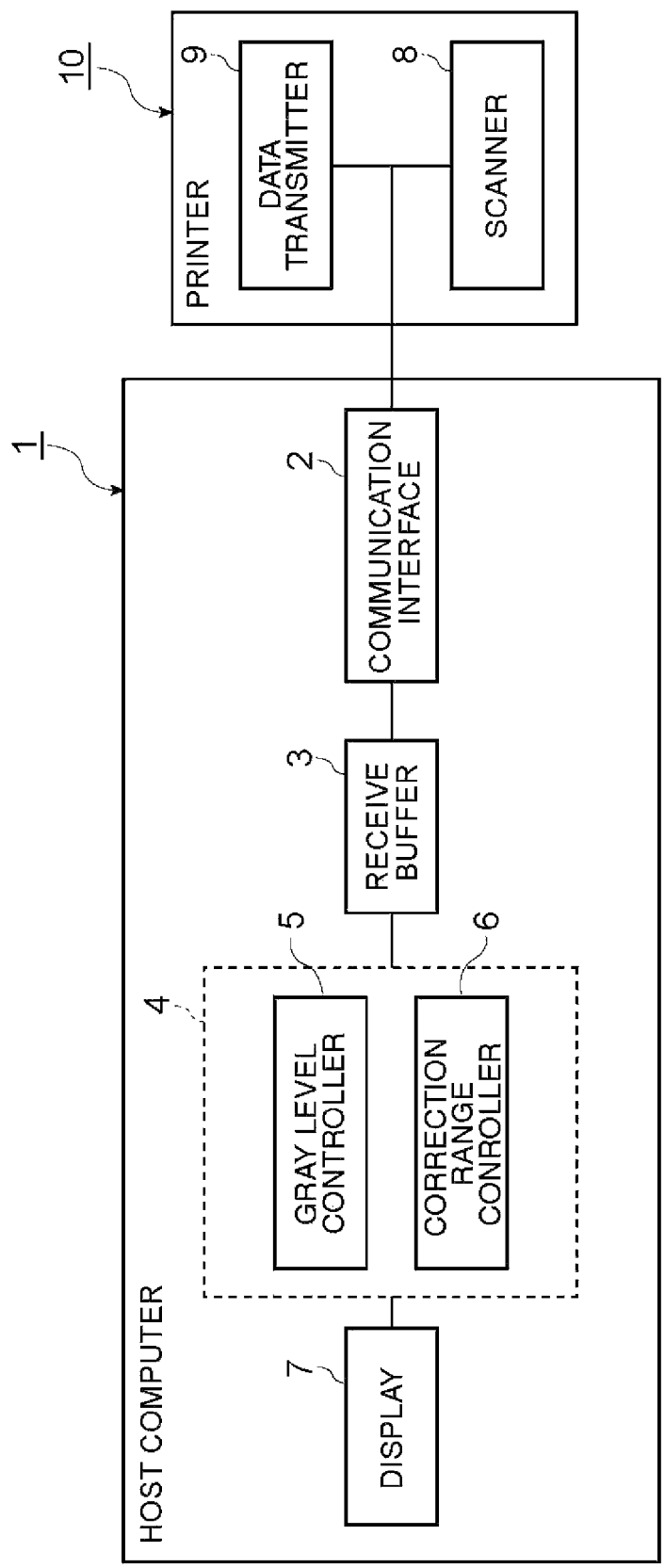
FIG. 1 is a block diagram showing the control structure of a host computer and printer according to a preferred embodiment of the present invention.

FIG. 1 is a block diagram showing the general structure of the host computer 1 and printer 10 according to this embodiment of the invention.

The printer 10 in this embodiment of the invention is a hybrid printer that can print on both the front and back sides of slips such as checks and can also print on roll paper for issuing sales receipts, for example. The printer 10 is in communication with an external host computer 1, and operates according to commands received from the host computer 1 to print and scan images.

The host computer 1 also executes processes based on data output by the printer 10 and received through the communication interface 2 from the printer 10.

A scanner 8 located in a slip transportation path (not shown) in printer 10 scans checks conveyed through the slip transportation path. A data transmitter 9 then outputs the captured image data to the host computer 1.

The host computer 1 includes a receive buffer 3, a gray level controller 5, a correction range controller 6, a display 7, and a main controller 4 that controls host computer 1 operation. The communication interface 2 is an interface enabling communication with the printer 10. All image data received from the printer 10 and all data sent from the host computer 1 to the printer 10 passes through this communication interface 2. The receive buffer 3 is a temporary storage for temporarily storing image data sent by the data transmission unit 9 of the printer 10.

The gray level controller 5 calculates statistical counts of the gray levels of the pixels in the image scanned by the scanner 8, and calculates a total of these statistical counts. The gray level of a pixel will be used in the present invention for lightening an image and for darkening the image. Each pixel in this embodiment is represented by eight bits and thus can be represented by one of 256 gray levels, ranging from 0 to 255.

The correction range controller 6 calculates the correction range for increasing image brightness (brightening the image) and the correction range for decreasing image brightness (darkening the image) based on the gray levels received from the gray level controller 5. The correction range for increasing image brightness and the correction range for decreasing image brightness do not have the same area in this invention, and the correction ranges are more particularly calculated so that the content of the image data presented on the display 7 is discernible regardless of the user setting. The display 7 displays image data corrected within these correction ranges.

The main controller 4 is the central controller of the host computer 1 and includes the gray level controller 5 and correction range controller 6, which execute specific operations. The main controller 4 controls certain operations of the host computer 1 based on the results of calculations performed by the gray level controller 5 and correction range controller 6. In this embodiment the controller 4 also corrects the image data within the correction range calculated by the correction range controller 6 and displays the corrected image data on the display 7.

Image Correction Process

The general image correction process executed by the host computer 1 in this embodiment of the invention is described next with reference to FIG. 2, FIG. 3, and Tables 1 to 3. Tables 1 to 3 are appended to the end of the specification.

Figure 2A:
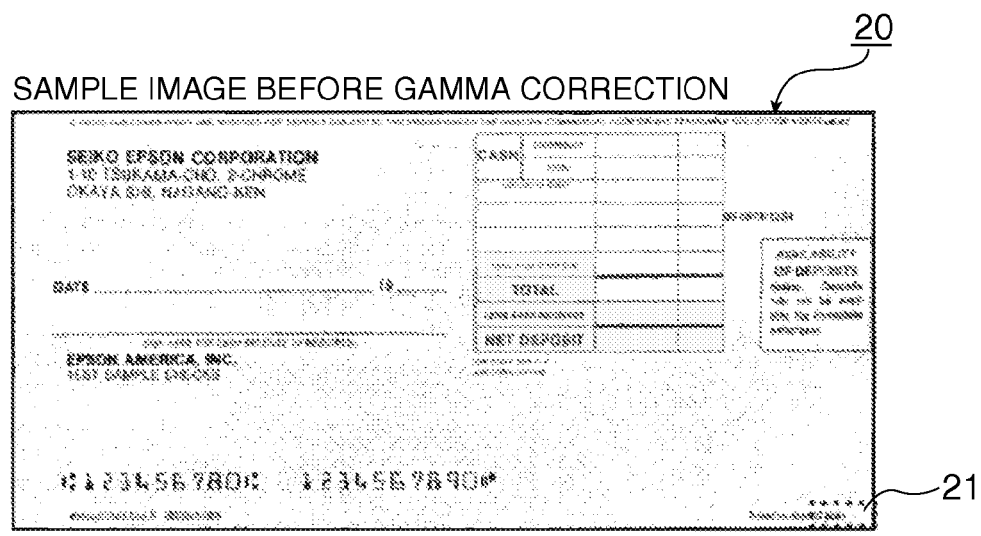
FIG. 2A shows the image of a deposit slip (check) inserted to the printer of the preferred embodiment.
Figure 2B:
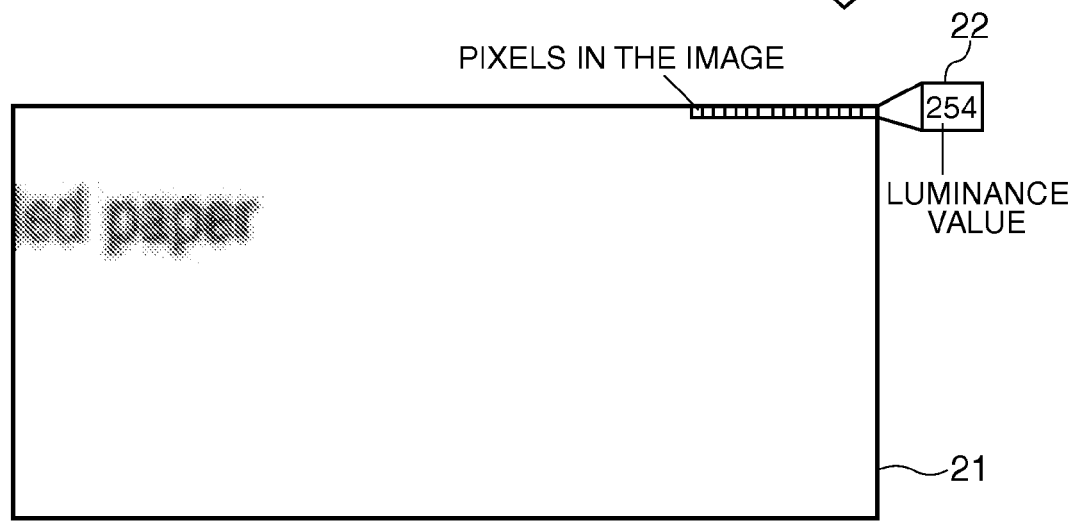
FIG. 2B shows an enlarged portion of the check.

FIG. 2A shows a typical deposit slip (check) 20 that is inserted into the printer 10, and FIG. 2B shows an enlarged portion 21 of the check in FIG. 2A.

Figure 3:
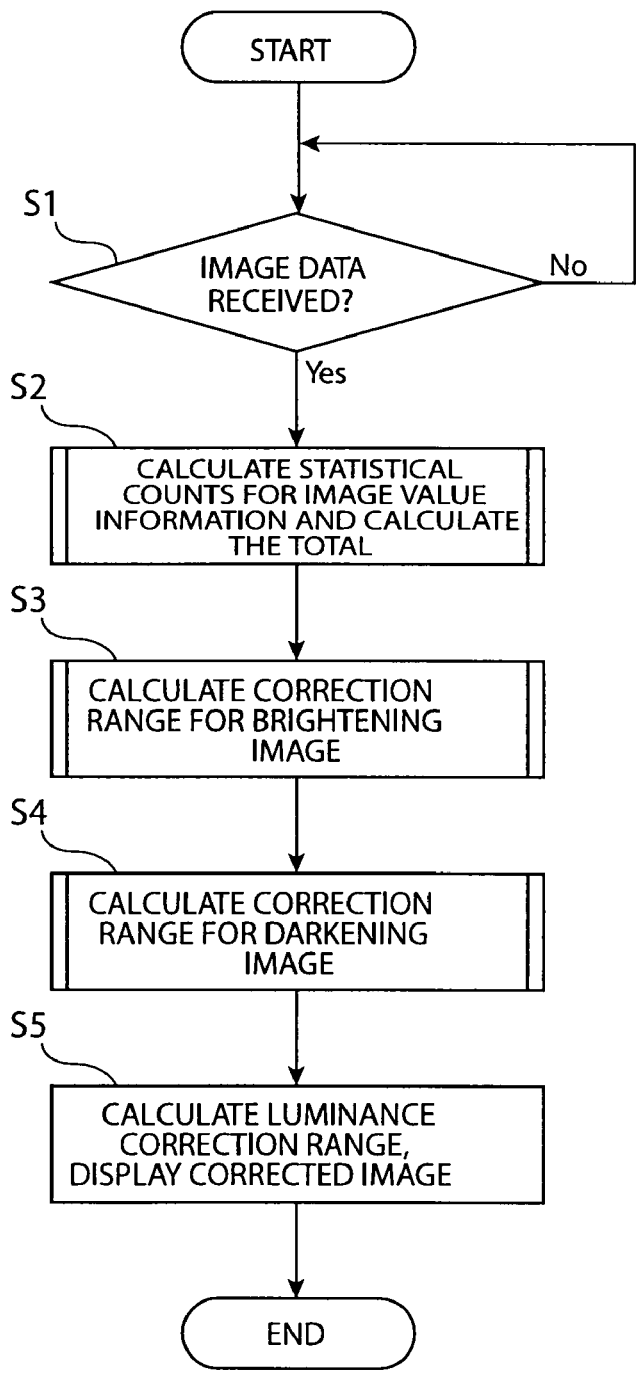
FIG. 3 is a flow chart of the correction process executed by the host computer 1.

FIG. 3 is a flow chart of the image correction process executed by the host computer 1 in this embodiment.

Tables 1 to 3 show the statistical count A that is calculated for the 256 gray levels 0 to 255 in the image data of the check 20, cumulative totals B1 and B2, and values C1 and C2 for determining the correction range. Note that images in this embodiment are represented using an 8-bit 256-level gray scale ranging from 0 (dark (black)) to 255 (bright (white)). The gray level is referred to a "luminance level" in the tables.

The invention can also be applied to color images. If color images are processed, the color image data is preferably first converted to gray scale image data where BW=0.2999R+ 0.587G+0.114B, and the gray scale image data is then processed.

When a user inserts a check 20 into the insertion slot (not shown) of the printer 10, the scanner 8 scans the check 20 and the data transmission unit 9 sends the captured image data to the host computer 1. As shown in FIG. 2B, the scanner 8 resolves the check 20 image to R pixels as defined by a preset image resolution R and reads the gray level (the luminance value of pixel 22 shown in FIG. 2B is 254) of the R pixels to convert the scanned image to image data.

When image data is received through the communication interface 2 (step S1 returns Yes), the host computer 1 temporarily stores the image data in the receive buffer 3. The gray level controller 5 then calculates statistical counts for each of the 256-level gray scale levels for all pixels, and adds the calculated statistical counts to calculate the total (step S2).

This embodiment is described as calculating statistical counts of each gray level for every pixel in the check 20 image where resolution R=162,074. It is not always necessary to acquire the gray level for all pixels, however, as long as there are enough gray levels to determine a uniform statistical distribution of gray levels in the entire image. For example, pixels in the check 20 image could be sampled in a checkered pattern to acquire the gray level of every other pixel instead of every pixel.

The correction range controller 6 then calculates a correction range for brightening the image and a correction range for darkening the image based on the statistical counts of the 256 gray levels (step S3 and step S4), and calculates a luminance correction range. The controller 4 then corrects the image data in the calculated correction range according to the user-defined luminance setting, and displays the image on the display 7 (step S5). Note that steps S3 and S4 can be reversed so that the correction range for darkening the image is calculated before the correction range for brightening the image.

Process for Acquiring Statistical Counts for the Gray Level

Figure 4:
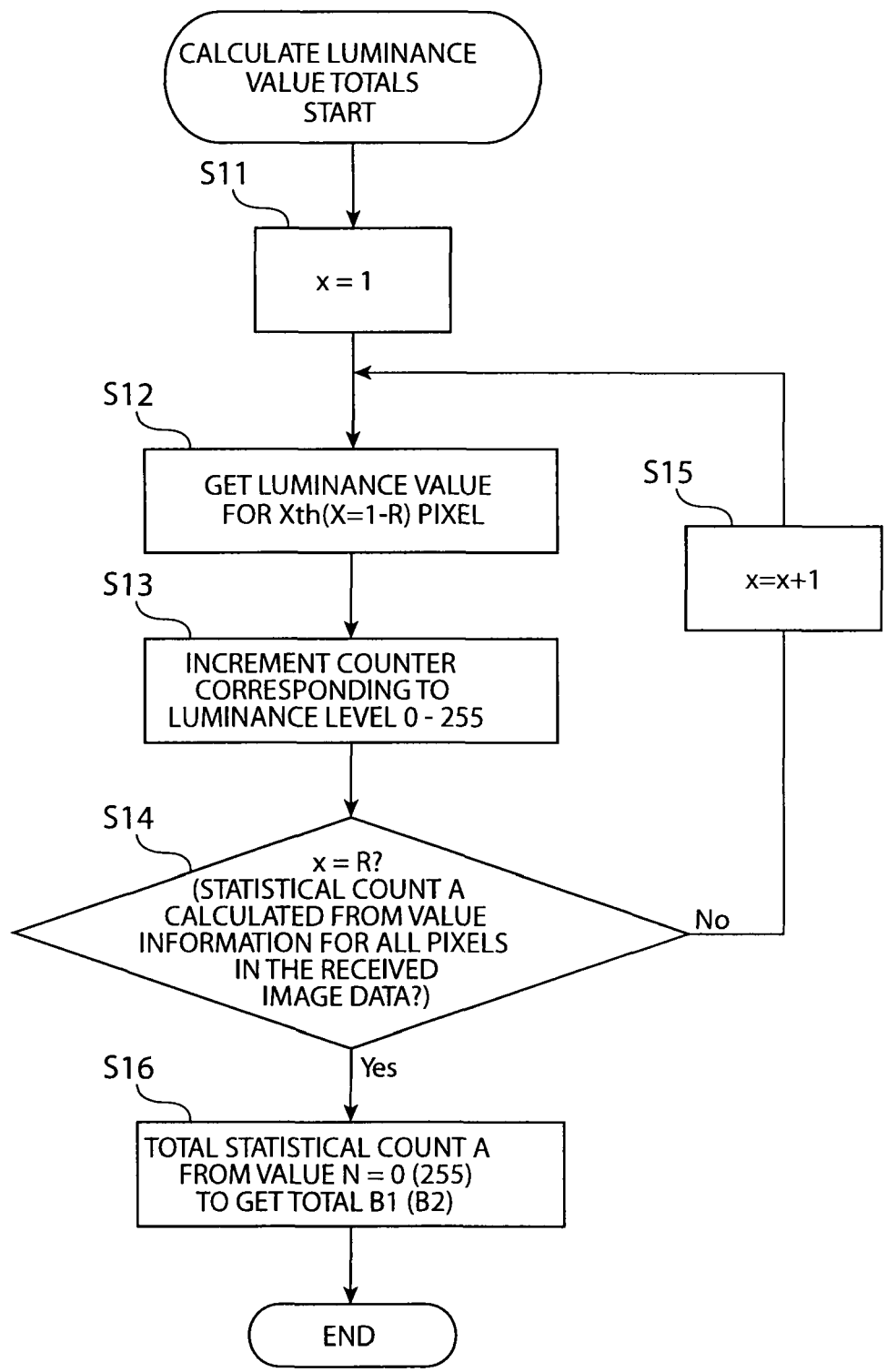
FIG. 4 is a flow chart of the process for calculating statistical counts of the gray levels and totaling the statistical counts.
Figure 6:
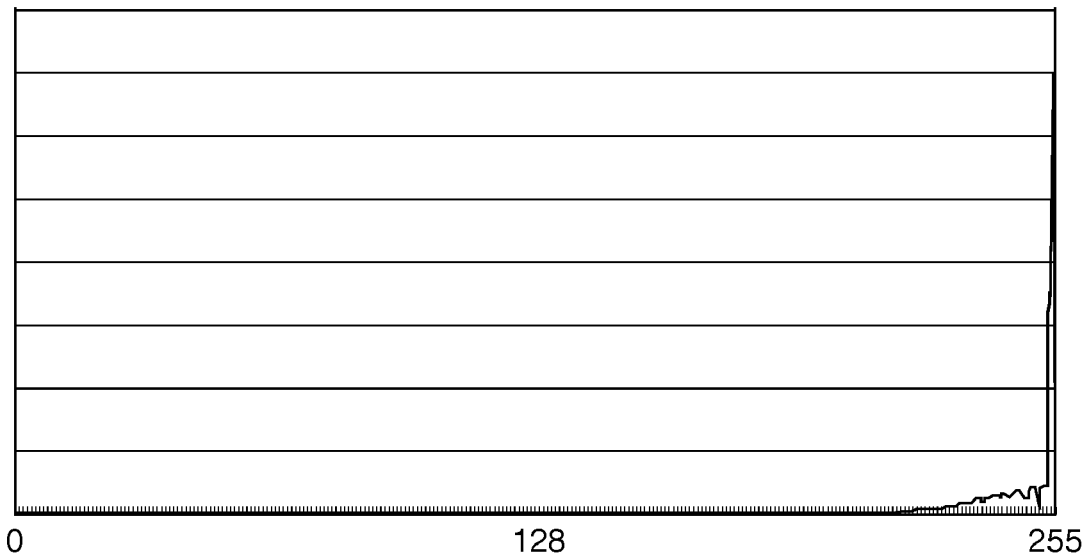
FIG. 6 shows a histogram generated from the statistical counts of the gray levels from the check.

The process for calculating the totals of the gray levels in step S2 in FIG. 3 is described next with reference to FIG. 4, FIG. 6, and Tables 1 to 3. FIG. 4 is a flow chart of the process for calculating statistical count A and total B1 (B2). FIG. 6 shows a histogram generated from the statistical counts of the gray levels from the check 20. Tables 1 to 3 show the statistical count A that is calculated for every n luminance (gray) level ranging from 0 to 255, cumulative totals B1 and B2, and values C1 and C2 for determining the correction range.

The gray level controller 5 reads the 8-bit gray level (luminance value) of the first pixel (x=1) read from the gray levels for the R=162,074 pixels stored in the receive buffer 3 to acquire gray level n (steps S11, S12). The counter for the gray level n of the first pixel in gray level 0-255 is then increased by 1. The gray level n of the pixel read second (x=x+1=2) is then acquired and the counter for the gray level n of this second pixel is incremented 1 (step S14 returns No, step S15, step S12, step S13). For example, because the gray level n of pixel 22 in FIG. 2(b) is 254, a bright gray level, the gray level controller 5 increments the counter (not shown) for gray level 254 (of gray levels 0 to 255) corresponding to the gray level n of pixel 22 by one. As a result, the statistical count A for gray level n=254 in Table 1 is increased by 1.

Once these steps repeat and statistical count A (that is, the count) is obtained from the gray level for all pixels (when x=R), statistical count A is accumulated sequentially from gray level n=0 (black) to gray level n=127 to calculate total B1 (the left side of Tables 1, 2, and 3, beginning with Table 1). Total B2 (the right side of Tables 1, 2, and 3, beginning with Table 3) is likewise calculated by accumulating statistical count A sequentially from gray level n=255 (white) to gray level n=128 (step S14 returns Yes, step S16).

As shown by the histogram in FIG. 6, if the gray levels 0 (black) to 255 (white) are plotted on the x-axis and statistical count A is on the y-axis, there is substantially no dark gray level, the curve starts to rise from approximately gray level n=230, and the curve peaks at gray level n=254. This means that the image data for the check 20 overall contains little dark gray levels and contains mostly bright gray levels.

Figure 5:
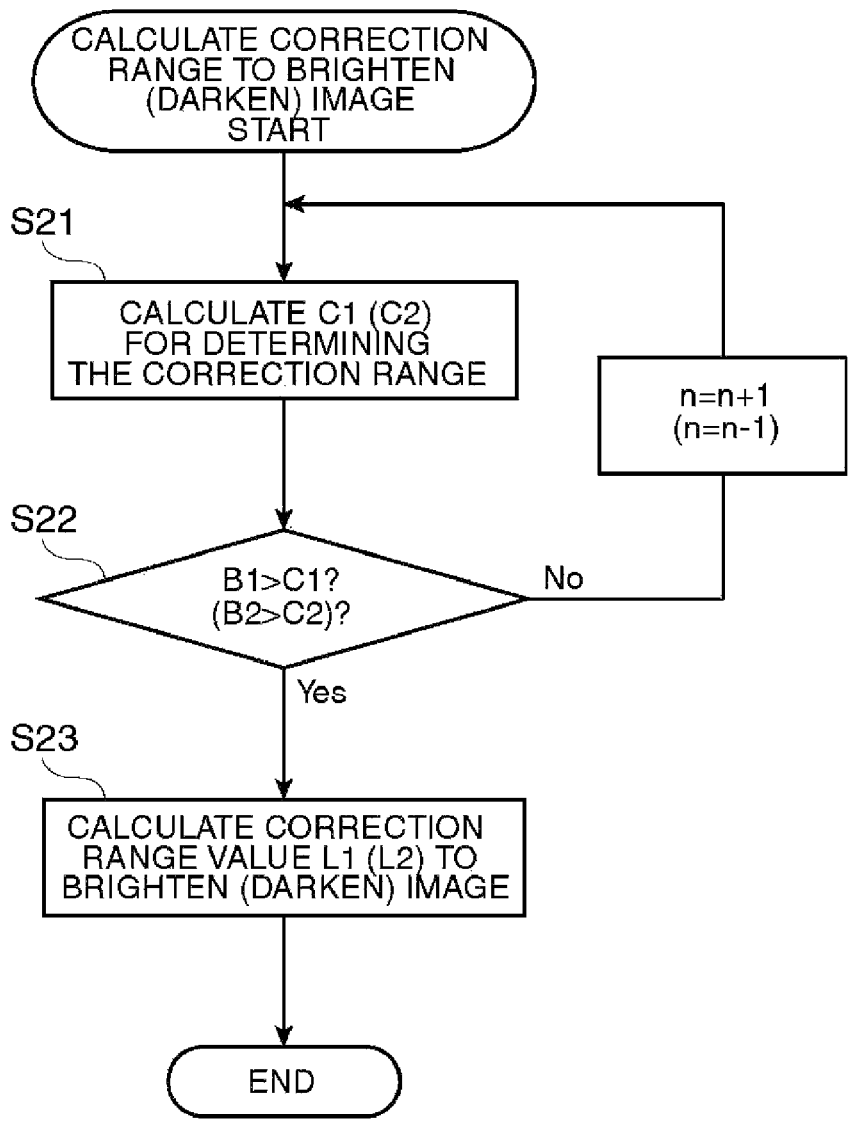
FIG. 5 is a flowchart of the process for acquiring the correction range for brightening the image and the correction range for darkening the image.

Acquiring the Correction Range for Brightening the Image and the Correction Range for Darkening the Image Step S3 in FIG. 3 for determining the correction range for brightening the image and step S4 for determining the correction range for darkening the image are described in further detail below with reference to FIG. 5 and Tables 1 to 3. FIG.

5 is a flow chart describing the process for determining the correction range for brightening the image or correction range for darkening the image.

Step S3 for acquiring the correction range for brightening the image is described first.

The correction range controller 6 calculates value C1 for acquiring the correction range for brightening the image (step S21). This value C1 for acquiring the correction range for brightening the image can be calculated using the following equation.

$$C1=(128-n)*B1/128$$

where n is the gray level ($0<=n<=127$) and B1 is the cumulative total for n.

The gray level n where B1>C1 is then stored (step S22 returns Yes).

As indicated by arrow X in Table 2, the gray level n where B1>C1 in the image of check 20 is n=80, and the value 80 is therefore stored.

The correction range value L1 for increasing image brightness from the stored gray level n is then calculated (step S23). The correction range value L1 for increasing image brightness can be calculated using the following equation.

$$L1=128-n$$

where n is the gray level at which B1>C1.

In the check 20 image in this example L1=128−80=48 is obtained as the correction range value for brightening the image. The resultant correction range for brightening the image is expressed in gray value levels as $128<=n<=176$ (176=128+48). Thus, for this generally bright image, the brightening range does not extend to gray level values at the brightest end of the scale.

The value C2 for determining the correction range for darkening the image can be determined using the following equation.

$$C2=(n-127)*B2/128$$

where n is the gray level ($128<=n<=255$) and B2 is the cumulative total for n.

The gray level n where B2>C2 is then stored.

As indicated by arrow Y in Table 1, B2>C2 at gray n=233 in the image of this check 20, and the value 233 is therefore stored.

The correction range value L2 for darkening the image can be calculated as follows.

$$L2=n-127$$

where n is the gray level at which B2>C2.

In the check 20 image in this example L2=233−127=106 is obtained as the correction range value for darkening the image. The resultant correction range for darkening the image is expressed in gray value levels as $21<=n<=127$ (21=128−106). Thus, for this generally bright image, the darkening range does not extend to gray level values at the darkest end of the scale.

In this embodiment of the invention the value C1 for determining the correction range for brightening the image is weighted by the cumulative total for low gray levels n=0 to 127, the value C2 for determining the correction range for darkening the image is weighted by the cumulative total for high gray levels n=255 to 128, and the average is then calculated. As a result, a correction range that more appropriately reflects the actual image data read can be determined even if the scanned image contains a biased gray level distribution with mostly bright gray level as shown by the histogram in FIG. 6.

By thus separately calculating the correction range value L1 for brightening the image from the cumulative total of the dark gray levels n=0 to 127, and the correction range value L2 for darkening the image from the cumulative total of the bright gray levels n=255 to 128, the correction range for brightening the image is reduced (from the maximum, brightest, gray level value 255) and the correction range for darkening the image is increased (from the minimum, darkest, gray level value 0) when the scanned image is light overall, and a correction range appropriate to the correction required for the image of the check 20 can be calculated. More specifically, because the correction range that is unsuitable for the check 20 image is dropped and correction is limited to the appropriate correction range, a readable image can be consistently presented without whiteout or blackout.

FIG. 7 shows the gamma curves of the luminance correction range acquired from this process with the gray level input values on the x-axis and the output values of the corrected gray level on the y-axis. FIG. 7A shows the gamma curve 31 when the image correction value set by the user using the host computer 1 is 127, FIG. 7B shows the curve 32 when the image correction setting is 192, FIG. 7C shows the curve 33 when the image correction setting is 255, FIG. 7D shows the curve 34 when the image correction setting is 64, FIG. 7E shows the curve 35 when the image correction setting is 0, and FIG. 7F shows the curves when the gamma correction curves for image correction settings of 0 and 255 are plotted together.

As shown in FIG. 7F, by separately calculating the correction range VALUE L1 for brightening the image and the correction range VALUE L2 for darkening the image, the gamma curve 33 for a correction setting of 0 and the gamma curve 35 for a correction setting of 255 defining the correction range 36 are asymmetric.

As described above, by removing more of the correction range that results in excessive image brightness than the correction range that results in excessive image darkness when the scanned image is light overall, a usable readable image can be consistently displayed without causing whiteout regardless of the correction level set by the user as shown in FIGS. 7A, B, and C. Likewise, by removing more of the correction range that results in excessive image darkness than the correction range that results in excessive image brightness when the scanned image is dark overall, a usable readable image can be consistently displayed without causing blackout regardless of the correction level set by the user.

Because the statistical counts of the gray level are biased in this example, the value C1 for determining the correction range for brightening the image and the value C2 for determining the correction range for darkening the image are weighted by totals B1 and B2, respectively, before taking the average, but other calculation methods can be used instead.

Figure 8A:
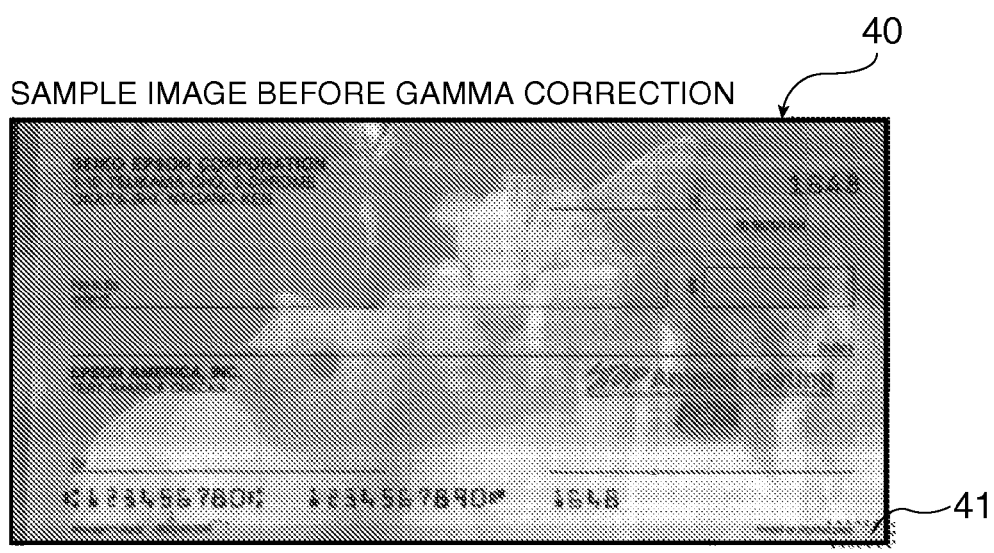
FIG. 8A shows another example of a check inserted into the printer of the preferred embodiment.
Figure 8B:
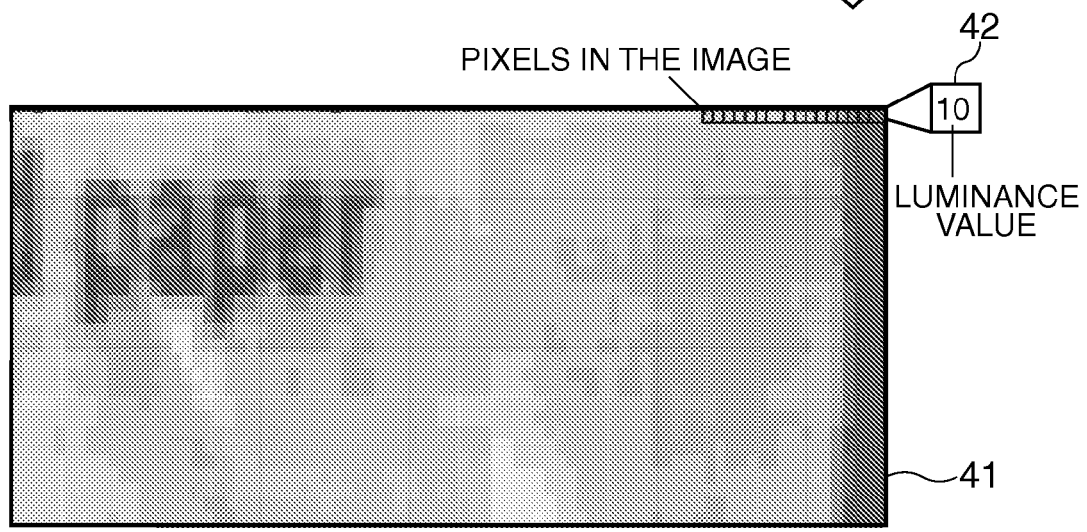
FIG. 8B shows a portion of the check enlarged.
Figure 9:
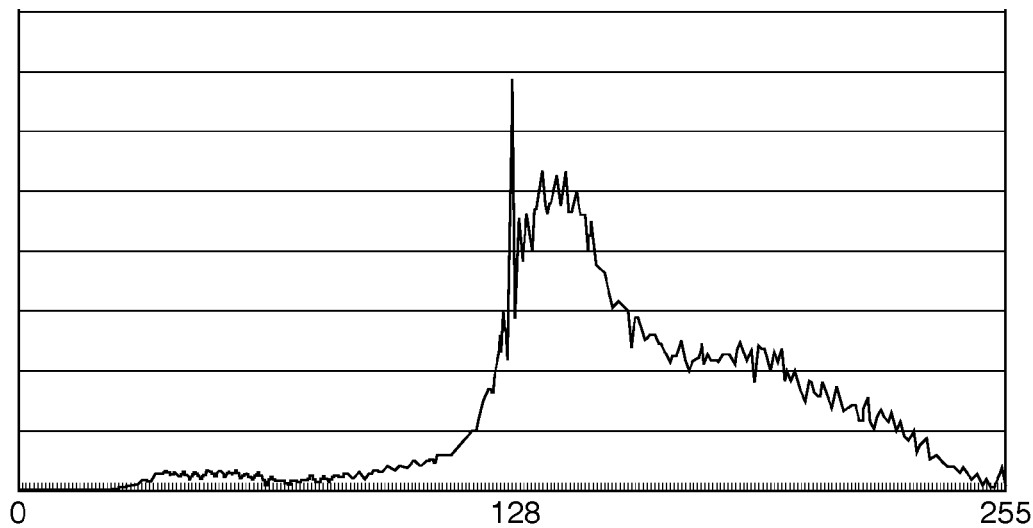
FIG. 9 shows the histogram generated from the statistical counts of the gray levels from the check shown in FIG. 8.
Figure 10:
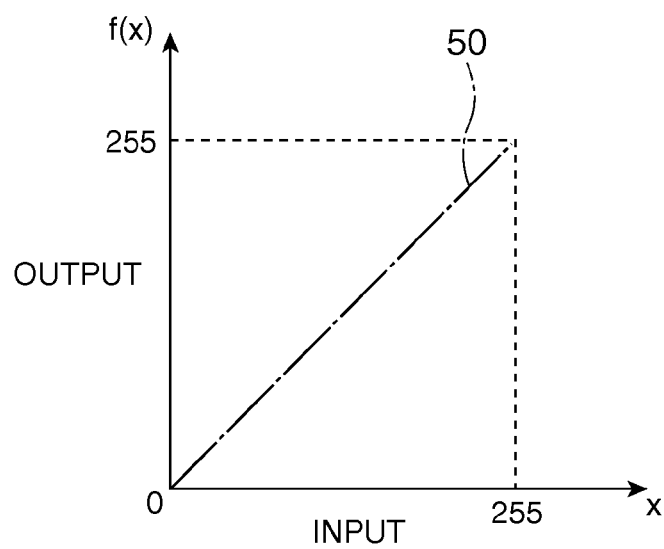
FIG. 10 shows a gamma curve when no image correction is applied.
Figure 11:
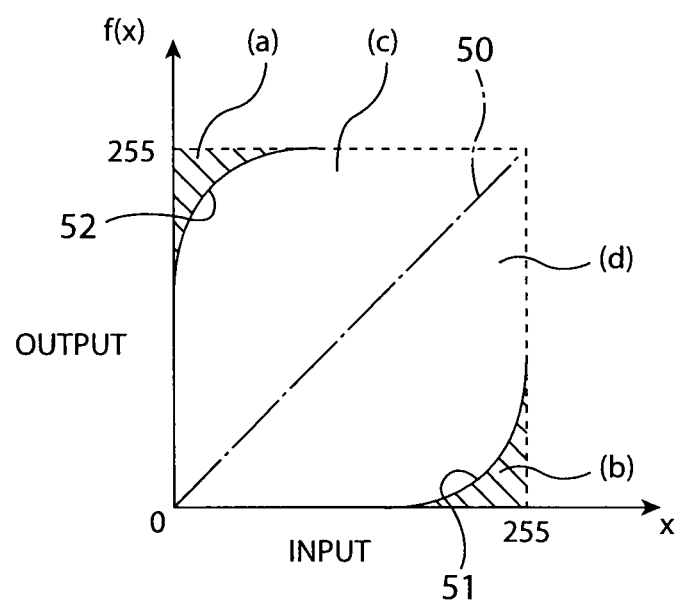
FIG. 11 shows the gamma curves for f(x)=0 and f(x)=255.
Figure 12:
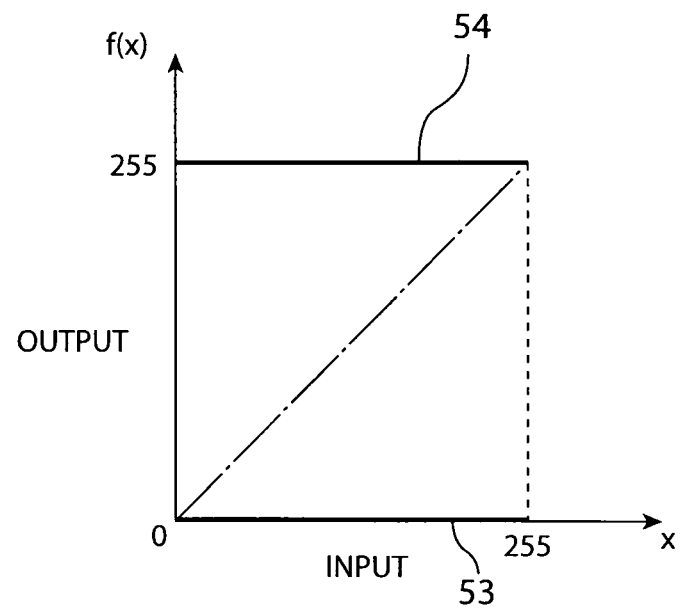
FIG. 12 shows the gamma curves defining the correction range of the related art.

For example, if the check 40 is dark overall as shown in FIG. 8A and the luminance level n of pixel 42 is a dark gray level of 10 as shown in FIG. 8B, in the group of counters (not shown) for gray levels n=0 to 255 the gray level controller 5 increments the counter for n=10 by one (step S13), and the histogram generated from the counts of the gray level for all pixels (step S14 returns Yes) appears as shown in FIG. 9.

If the gray levels 0 (dark) to 255 (bright) are on the x-axis and the statistical count totals are on the y-axis, there is substantially no dark gray level, the peak is at an intermediate luminance level between n=127 and n=140, and the curve gradually decreases from luminance level n=140 to n=255. When the distribution of statistical counts is not particularly biased and the distribution is wide, the simple average can be taken.

More specifically, the correction range controller 6 can calculate the value C1 for determining the correction range for brightening the image as follows.

$$C1 = E1/10$$

where E1 is the sum of all n=0 to 127.

The luminance level n at which B1>C1 where B1 is the total for a given n is then stored.

The correction range controller 6 can calculate the value C2 for determining the correction range for darkening the image as follows.

$$C2 = E2/10$$

where E2 is the sum of all n=255 to 128.

The luminance level n at which B1>C1 where B1 is the total for a given n is then stored.

This embodiment of the invention is described using a pixel depth of 8 bits and 256 gray levels, but the invention is not so limited and can be used with an m-bit pixel depth, that is, $2^m$ gray levels. In this case a first total accumulated from 0 and a second total accumulated from $2^{m-1}$ are calculated. Further preferably, the totals from 0 to $2^{m-1}-1$ and from $2^m-1$ to $2^{m-1}$ are used for weighting.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

TABLES 1

| n LUMINANCE LEVEL | A STATISTICAL COUNT | B1 TOTAL | C1 | n LUMINANCE LEVEL | A STATISTICAL COUNT | B2 TOTAL | C2 |
|---|---|---|---|---|---|---|---|
| 0 | 0 | 0 | 8839.0 | 250 | 0 | 0 | 153235.0 |
| 1 | 0 | 0 | 8769.9 | 254 | 70309 | 70309 | 152037.9 |
| 2 | 0 | 0 | 8700.9 | 253 | 4183 | 74492 | 150840.7 |
| 3 | 0 | 0 | 8631.8 | 252 | 4110 | 78602 | 149643.6 |
| 4 | 0 | 0 | 9562.8 | 251 | 447 | 79049 | 148446.4 |
| 5 | 0 | 0 | 8493.7 | 250 | 4177 | 83226 | 147249.3 |
| 6 | 0 | 0 | 8424.7 | 249 | 4201 | 87427 | 146052.1 |
| 7 | 0 | 0 | 8355.6 | 248 | 2254 | 89681 | 144855.0 |
| 8 | 0 | 0 | 8286.6 | 247 | 2743 | 92424 | 143657.8 |
| 9 | 0 | 0 | 8217.5 | 246 | 3770 | 9194 | 142460.7 |
| 10 | 0 | 0 | 8148.5 | 245 | 3058 | 99252 | 141263.5 |
| 11 | 0 | 0 | 8079.4 | 244 | 2691 | 101943 | 140066.4 |
| 12 | 0 | 0 | 8010.3 | 243 | 3210 | 105153 | 138869.2 |
| 13 | 0 | 0 | 7941.3 | 242 | 2754 | 107967 | 137672.1 |
| 14 | 0 | 0 | 7872.2 | 241 | 2719 | 110626 | 136474.9 |
| 15 | 0 | 0 | 7803.2 | 240 | 2826 | 113452 | 135277.8 |
| 16 | 0 | 0 | 7734.1 | 269 | 2519 | 115971 | 134080.6 |
| 17 | 0 | 0 | 7665.1 | 238 | 2247 | 118218 | 132883.5 |
| 18 | 0 | 0 | 7596.0 | 237 | 2241 | 120459 | 131686.3 |
| 19 | 0 | 0 | 7527.0 | 236 | 2450 | 122909 | 130489.2 |
| 20 | 0 | 0 | 7457.9 | 235 | 1898 | 124807 | 129292.0 |
| 21 | 0 | 0 | 7388.9 | 234 | 1667 | 126474 | 128094.9 |
| 22 | 0 | 0 | 7319.8 | 233 | 1790 | 128264 | 126897.7 ←Y |
| 23 | 0 | 0 | 7250.7 | 232 | 1626 | 129890 | 125700.6 |
| 24 | 0 | 0 | 7181.7 | 231 | 1438 | 131328 | 124503.4 |
| 25 | 0 | 0 | 7112.6 | 230 | 1199 | 132527 | 123306.3 |
| 26 | 0 | 0 | 7043.6 | 229 | 1163 | 133690 | 122109.1 |
| 27 | 0 | 0 | 6974.5 | 228 | 1136 | 134826 | 120912.0 |
| 28 | 0 | 0 | 6900.5 | 227 | 947 | 135773 | 119714.8 |
| 29 | 0 | 0 | 6834.4 | 226 | 817 | 136590 | 118517.7 |
| 30 | 0 | 0 | 6767.4 | 225 | 851 | 137441 | 117320.5 |
| 31 | 0 | 0 | 6698.3 | 224 | 779 | 138220 | 116123.4 |
| 32 | 0 | 0 | 6629.3 | 223 | 710 | 138930 | 114926.3 |
| 33 | 0 | 0 | 6560.2 | 222 | 572 | 139502 | 113729.1 |
| 34 | 1 | 1 | 6491.1 | 221 | 657 | 140159 | 112532.0 |
| 35 | 2 | 3 | 6422.1 | 220 | 464 | 140623 | 111334.8 |
| 36 | 2 | 5 | 6353.0 | 219 | 511 | 141134 | 110137.7 |
| 37 | 1 | 6 | 6284.0 | 218 | 449 | 141583 | 108940.5 |
| 38 | 9 | 15 | 6214.9 | 217 | 409 | 141992 | 107743.4 |
| 39 | 5 | 20 | 6145.9 | 216 | 323 | 142315 | 106546.2 |
| 40 | 7 | 27 | 6076.8 | 215 | 387 | 142702 | 105349.1 |
| 41 | 29 | 56 | 6007.8 | 214 | 298 | 143000 | 104151.9 |
| 42 | 28 | 84 | 5938.7 | 213 | 26 | 143276 | 102954.8 |
| 43 | 14 | 98 | 5869.6 | 212 | 264 | 143540 | 101757.6 |
| 44 | 33 | 131 | 5800.6 | 211 | 250 | 143790 | 100560.5 |
| 45 | 51 | 182 | 5731.5 | 210 | 235 | 144025 | 99363.3 |
| 46 | 49 | 231 | 5662.5 | 209 | 227 | 144252 | 98166.2 |
| 47 | 57 | 288 | 5593.4 | 208 | 180 | 144432 | 96969.0 |
| 48 | 92 | 380 | 5524.4 | 207 | 207 | 144639 | 95771.9 |
| 49 | 54 | 434 | 5455.3 | 206 | 179 | 144808 | 74574.7 |

TABLES 2

| n LUMINANCE LEVEL | A STATISTICAL COUNT | B1 TOTAL | C1 | n LUMINANCE LEVEL | A STATISTICAL COUNT | B2 TOTAL | C2 |
|---|---|---|---|---|---|---|---|
| 50 | 89 | 523 | 5386.3 | 205 | 163 | 144981 | 93377.6 |
| 51 | 83 | 606 | 5317.2 | 204 | 157 | 145138 | 92180.4 |
| 52 | 88 | 694 | 5248.2 | 203 | 131 | 145269 | 90983.3 |
| 53 | 108 | 802 | 5179.1 | 202 | 174 | 145443 | 89786.1 |
| 54 | 111 | 913 | 5110.0 | 201 | 136 | 145579 | 88589.0 |
| 55 | 61 | 974 | 5041.0 | 200 | 151 | 145730 | 87391.8 |
| 56 | 156 | 1130 | 4971.9 | 199 | 135 | 145865 | 86194.7 |
| 57 | 136 | 1266 | 4902.9 | 198 | 128 | 145993 | 84997.5 |
| 58 | 75 | 1341 | 4833.8 | 197 | 160 | 146153 | 93800.4 |
| 59 | 118 | 1459 | 4764.8 | 196 | 113 | 146266 | 82603.2 |
| 60 | 116 | 1575 | 4695.7 | 195 | 106 | 146372 | 81406.1 |
| 61 | 95 | 1670 | 4626.7 | 194 | 100 | 146472 | 80208.9 |
| 62 | 103 | 1773 | 4557.6 | 193 | 120 | 146592 | 79011.8 |
| 63 | 106 | 1879 | 4488.6 | 192 | 106 | 146698 | 77814.6 |
| 64 | 83 | 1962 | 4419.5 | 191 | 131 | 146829 | 76617.5 |
| 65 | 99 | 2061 | 4350.4 | 190 | 77 | 146906 | 75420.4 |
| 66 | 104 | 2165 | 4281.4 | 189 | 110 | 147016 | 74223.2 |
| 67 | 78 | 2243 | 4212.3 | 188 | 90 | 147106 | 73026.1 |
| 68 | 84 | 2327 | 4143.3 | 187 | 99 | 147205 | 71828.9 |
| 69 | 91 | 2418 | 4074.2 | 186 | 107 | 147312 | 70631.8 |
| 70 | 88 | 2506 | 4005.2 | 185 | 97 | 147409 | 69434.6 |
| 71 | 104 | 2610 | 3936.1 | 184 | 88 | 147497 | 68237.5 |
| 72 | 92 | 2702 | 3867.1 | 183 | 98 | 147595 | 67040.3 |
| 73 | 101 | 2803 | 3798.0 | 182 | 101 | 147696 | 65843.2 |
| 74 | 93 | 2896 | 3729.0 | 181 | 95 | 147791 | 64646.0 |
| 75 | 90 | 2986 | 3659.9 | 180 | 89 | 147880 | 63448.9 |
| 76 | 96 | 3082 | 3590.8 | 179 | 120 | 147800 | 62251.7 |
| 77 | 87 | 3169 | 3521.8 | 178 | 101 | 148101 | 61054.6 |
| 78 | 103 | 3272 | 3452.7 | 177 | 102 | 148203 | 59857.4 |
| 79 | 101 | 3373 | 3383.7 | 176 | 78 | 148281 | 58660.3 |
| X→ 80 | 113 | 3486 | 3314.6 | 175 | 97 | 148378 | 57463.1 |
| 81 | 78 | 3564 | 3245.6 | 174 | 87 | 148465 | 56266.0 |
| 82 | 93 | 3657 | 3176.5 | 173 | 93 | 148558 | 55068.8 |
| 83 | 119 | 3776 | 3107.5 | 172 | 90 | 148648 | 53871.7 |
| 84 | 122 | 3898 | 3038.4 | 171 | 105 | 148753 | 52674.5 |
| 85 | 112 | 4010 | 2969.4 | 170 | 78 | 148831 | 51477.4 |
| 86 | 78 | 4088 | 2900.3 | 169 | 87 | 148918 | 50280.2 |
| 87 | 93 | 4181 | 2831.2 | 168 | 84 | 149002 | 49083.1 |
| 88 | 144 | 4325 | 2762.2 | 167 | 81 | 149083 | 47885.9 |
| 89 | 105 | 4430 | 2693.1 | 166 | 100 | 149183 | 46688.8 |
| 90 | 116 | 4546 | 2624.1 | 165 | 91 | 149274 | 45491.6 |
| 91 | 150 | 4696 | 2555.0 | 164 | 84 | 149358 | 44294.5 |
| 92 | 127 | 4823 | 2486.0 | 163 | 111 | 149469 | 43097.3 |
| 93 | 109 | 4932 | 2416.9 | 162 | 109 | 149578 | 41900.2 |
| 94 | 159 | 5091 | 2347.9 | 161 | 96 | 149674 | 40703.0 |
| 95 | 122 | 5213 | 2278.8 | 160 | 122 | 149796 | 39505.9 |
| 96 | 115 | 5328 | 2209.8 | 159 | 119 | 149915 | 38308.8 |
| 97 | 133 | 5461 | 2140.7 | 158 | 88 | 150003 | 37111.6 |
| 98 | 141 | 5602 | 2071.6 | 157 | 121 | 150124 | 35914.5 |
| 99 | 123 | 5725 | 2002.6 | 156 | 119 | 150243 | 34717.3 |

TABLES 3

| n LUMINANCE LEVEL | A STATISTICAL COUNT | B1 TOTAL | C1 | n LUMINANCE LEVEL | A STATISTICAL COUNT | B2 TOTAL | C2 |
|---|---|---|---|---|---|---|---|
| 100 | 119 | 5844 | 1933.5 | 155 | 124 | 150367 | 33520.2 |
| 101 | 119 | 5963 | 1864.5 | 154 | 98 | 150465 | 32323.0 |
| 102 | 120 | 6083 | 1795.4 | 153 | 107 | 150572 | 31125.9 |
| 103 | 114 | 6197 | 1726.4 | 152 | 124 | 150696 | 29928.7 |
| 104 | 130 | 6327 | 1657.3 | 151 | 108 | 150804 | 28731.6 |
| 105 | 92 | 6419 | 1588.3 | 150 | 101 | 150905 | 27534.4 |
| 106 | 127 | 6546 | 1519.2 | 149 | 119 | 151024 | 26337.3 |
| 107 | 136 | 6682 | 1450.1 | 148 | 119 | 151143 | 25140.1 |
| 108 | 100 | 6782 | 1381.1 | 147 | 115 | 151258 | 23943.0 |
| 109 | 102 | 6884 | 1312.0 | 146 | 113 | 151371 | 22745.8 |
| 110 | 117 | 7001 | 1243.0 | 145 | 106 | 151477 | 21548.7 |
| 111 | 84 | 4085 | 1173.9 | 144 | 98 | 151575 | 20351.5 |
| 112 | 122 | 7207 | 1104.9 | 143 | 106 | 151681 | 19154.4 |
| 113 | 110 | 7317 | 1035.8 | 142 | 111 | 151792 | 17957.2 |
| 114 | 89 | 7406 | 966.8 | 141 | 108 | 151900 | 16760.1 |

TABLES 3-continued

| n LUMINANCE LEVEL | A STATISTICAL COUNT | B1 TOTAL | C1 | n LUMINANCE LEVEL | A STATISTICAL COUNT | B2 TOTAL | C2 |
|---|---|---|---|---|---|---|---|
| 115 | 94  | 7500 | 897.7 | 140 | 100 | 152000 | 15562.9 |
| 116 | 105 | 7605 | 828.7 | 139 | 117 | 152117 | 14365.8 |
| 117 | 88  | 7693 | 759.6 | 138 | 87  | 152204 | 13168.6 |
| 118 | 106 | 7799 | 690.5 | 137 | 95  | 152299 | 11971.5 |
| 119 | 118 | 7919 | 621.5 | 136 | 109 | 152408 | 10774.3 |
| 120 | 99  | 8016 | 552.4 | 135 | 106 | 152514 | 95772 |
| 121 | 90  | 8106 | 483.4 | 134 | 108 | 152662 | 8380.0 |
| 122 | 128 | 8234 | 414.3 | 133 | 99  | 152721 | 7182.9 |
| 123 | 101 | 8335 | 345.3 | 132 | 120 | 152841 | 5985.7 |
| 124 | 82  | 8417 | 276.2 | 131 | 109 | 152950 | 4788.6 |
| 125 | 131 | 8548 | 207.2 | 130 | 83  | 153033 | 3591.4 |
| 126 | 77  | 8625 | 138.1 | 129 | 127 | 153160 | 2394.3 |
| 127 | 214 | 8839 | 69.1  | 128 | 75  | 153235 | 1197.1 |

What is claimed is:

1. An image correction apparatus for correcting gray levels representing pixels in an image, comprising:
    a controller that computes a correction range for the image by separately calculating for the image a correction range for correctively increasing the gray levels and a correction range for correctively decreasing the gray levels; and
    wherein each pixel in the image is represented by one of $2^m$ gray levels ranging from 0 to $2^m-1$ where a bit depth of each pixel is m bits; and
    the controller calculates a statistical count of each of the $2^m$ gray levels representing a plurality of pixels in the image,
        calculates a first total by accumulating the statistical counts starting from gray level 0 and a second total by accumulating the statistical counts starting from gray level $2^m-1$,
        calculates a value for determining a correction range for increasing the gray level and calculates a value for determining a correction range for decreasing the gray level,
        calculates a correction range that decreases the gray level based on the value at which the first total exceeds the value for determining the correction range increasing the gray level, and
        calculates a correction range that increases the gray level based on the value at which the second total exceeds the value for determining the correction range decreasing the gray level.

2. The image correction apparatus described in claim 1, wherein the value for determining a correction range for increasing the gray levels and the value for determining a correction range for decreasing the gray levels are acquired by weighting using the total from value 0 to $2^{m-1}-1$ and the total from value $2^m-1$ to $2^{m-1}$.

3. An image correction method for an image correction apparatus for correcting gray levels representing pixels in an image, comprising the steps of:
    first, calculating a correction range for increasing the gray levels and a correction range for decreasing the gray levels; and
    second, calculating a correction range for the image based on the correction range for increasing the gray level and the correction range for decreasing the gray level that were calculated in the first calculating step; and
    wherein the gray levels of the pixels in the image include $2^m$ gray levels ranging from 0 to $2^m-1$, where a bit depth of each pixel is m bits, and
    the first calculating step includes:
        calculating a statistical count for each of the $2^m$ gray levels representing a plurality of pixels,
        calculating a first total by accumulating the statistical counts starting from value 0 and a second total by accumulating the statistical counts starting from value $2^m-1$,
        calculating a value for determining a correction range for increasing the gray levels and calculates a value for determining a correction range for decreasing the gray levels,
        calculating a correction range that decreases the gray levels based on the value at which the first total exceeds the value for determining the correction range for increasing the gray level, and
        calculating a correction range that increases the gray levels based on the value at which the second total exceeds the value for determining the correction range for decreasing the gray levels.

4. The image correction method described in claim 3, wherein the value for determining a correction range for increasing the gray levels and the value for determining a correction range for decreasing the gray levels are acquired by weighting using the total from value 0 to $2^{m-1}-1$ and the total from value $2^m-1$ to $2^{m-1}$.

5. An image correction apparatus for correcting gray levels representing pixels in an image, comprising:
    a controller that computes a correction range for the image by separately calculating for the image a correction range for correctively increasing the gray levels and a correction range for correctively decreasing the gray levels; and
    wherein the controller determines a correlation between the gray levels before correctively increasing and the gray levels after correction, and a correlation between the gray levels before correctively decreasing and the gray levels after correction, and computes the correction range so that the correlation when the gray levels increase and the correlation when the gray levels decrease are asymmetric.

* * * * *